July 19, 1966   M. J. WELLS ETAL   3,262,095
METHOD AND APPARATUS FOR SIGNAL COMPOSITING AND RECORDING
Filed April 1, 1964   4 Sheets-Sheet 1
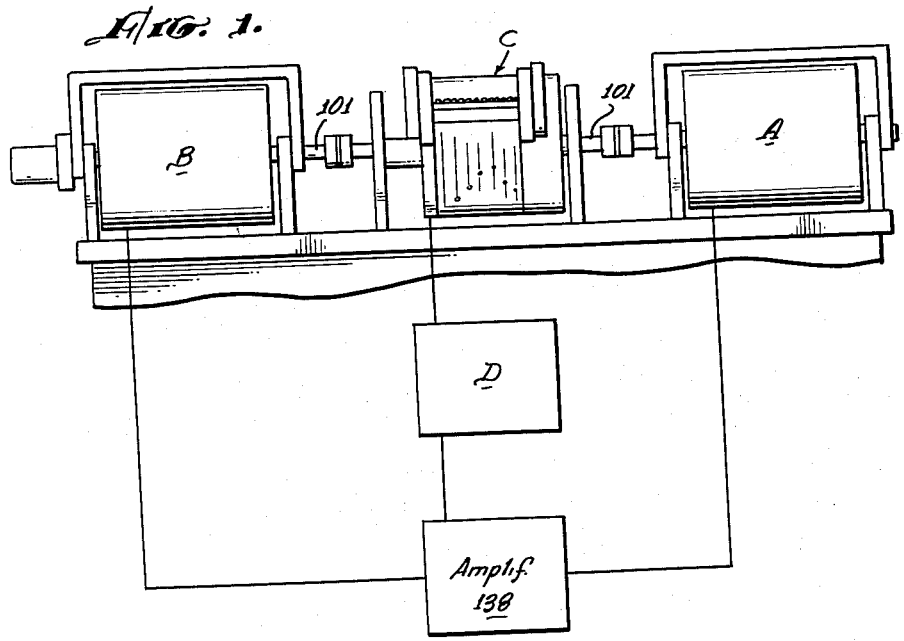
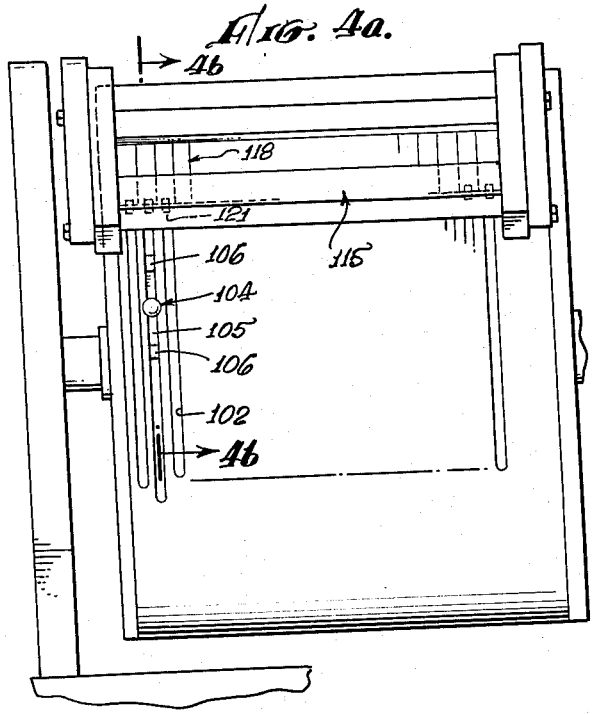
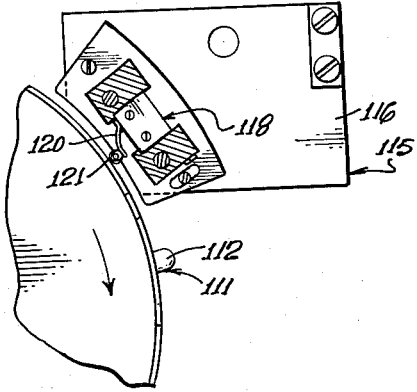
BOOTH B. STRANGE,
MELVIN J. WELLS,
INVENTORS.
BY THEIR ATTORNEYS.
Spensley & Horn.

July 19, 1966 M. J. WELLS ETAL 3,262,095
METHOD AND APPARATUS FOR SIGNAL COMPOSITING AND RECORDING
Filed April 1, 1964 4 Sheets-Sheet 2

BOOTH B. STRANGE,
MELVIN J. WELLS,
INVENTORS.

BY THEIR ATTORNEYS.
Spensley & Horn.

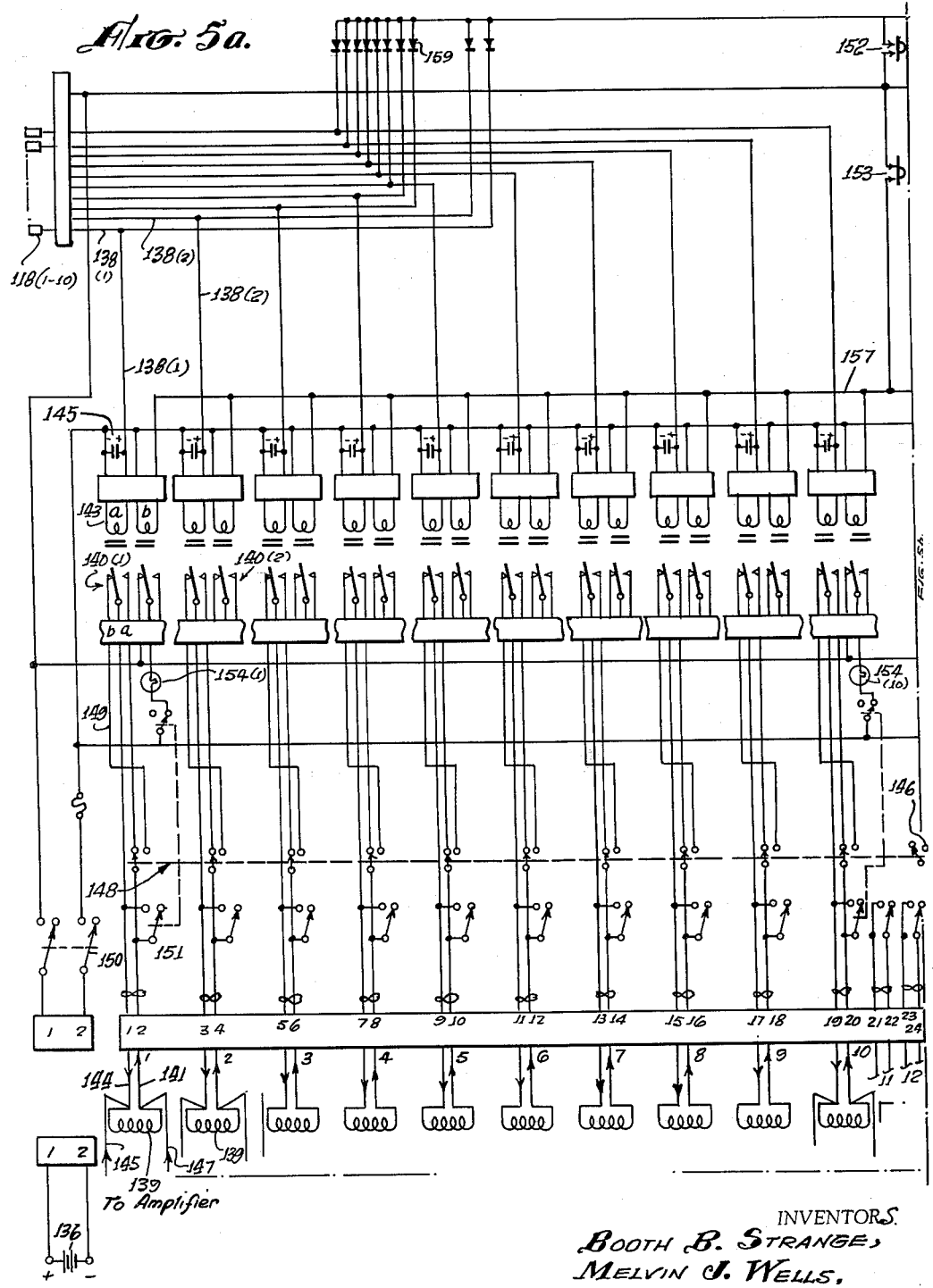

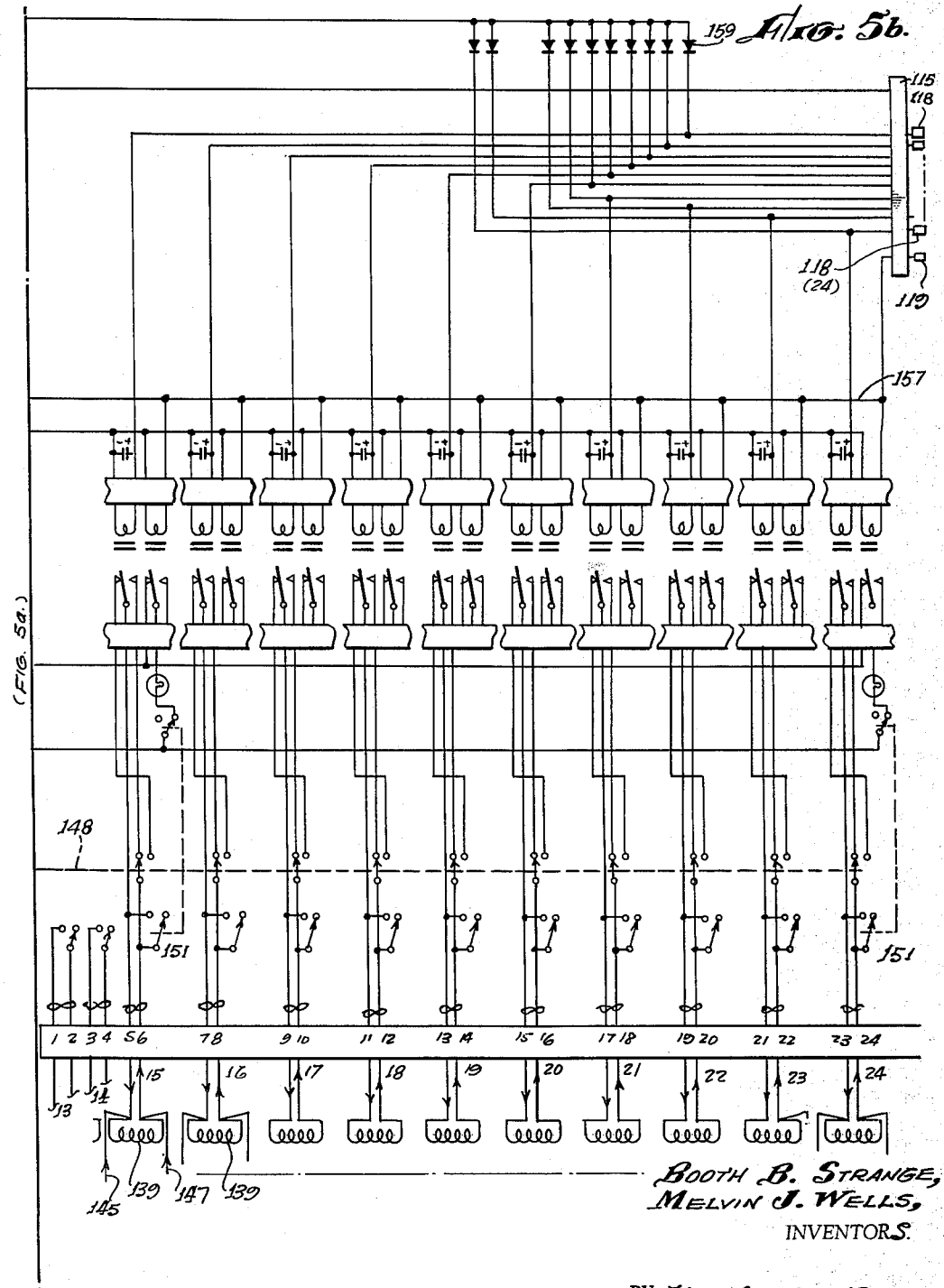

United States Patent Office 3,262,095
Patented July 19, 1966

3,262,095
METHOD AND APPARATUS FOR SIGNAL
COMPOSITING AND RECORDING
Melvin J. Wells, Torrance, Calif., and Booth B. Strange, Shreveport, La., assignors to Western Geophysical Company of America, Los Angeles, Calif., a corporation of Delaware
Filed Apr. 1, 1964, Ser. No. 356,386
17 Claims. (Cl. 340—15.5)

This invention relates to seismic exploration and more particularly to an improved apparatus for seismic exploration of the type wherein a plurality of separate vibration records are added to obtain a composite meaningful result.

In making seismographic surveys, by the reflection method, information concerning earth formations is obtained by transmitting vibrations from a first point at or near the surface of the earth downwardly into the formations and measuring the reflected or refracted vibrations at one or more second points spaced along the earth's surface from the first point. The record of the earth's disturbance produced at the second point by a shock initiated near the earth's surface at the first point shows waves which have penetrated the earth and have been reflected by interfaces between two layers of different properties or characteristics. In many cases, several interfaces are present at varying depths and the record will show waves reflected from such interfaces. The amplitude of such reflected waves will vary over a considerable range depending upon the reflection coefficient associated with each interface.

For example, in a common arrangement of seismographic exploratory and recording apparatus used for seismographic profiling work, a plurality of seismometer or detector groups are disposed in contact with the ground in a preferably straight line at opposite sides of the shock point. In order to produce the shock which will cause the disturbance it is common practice to utilize an explosive and to detonate the explosive at the shock point which is then referred to as the "shot point." A recording unit provided with suitable amplifying and recording means is electrically connected to the detectors to amplify and record the electrical impulse produced by the detectors upon the arrival at each detector group of seismic waves generated by the explosion at the shot point and reflected from the various underground formations.

The electrical impulses produced by the detector groups are recorded by multi-channel recording means such as drum-type magnetic tape recorders with a channel corresponding to each detector group. The detector signals are thus recorded on a time-scale record together with the instant of detonation. The signal corresponding to the instant of detonation is termed the "time break." The recorded information is then most generally corrected for various time scale differences which arise from the geometry of the field arrangement and the data are photographically reproduced to form a visual seismograph record.

Geographical areas vary greatly in reflection quality during seismographic exploration and in some areas or under certain circumstances the signal-to-noise ratio of the reflection signals is poor. That is, in some areas reflection quality is quite good so that it is easy for one skilled in the art to identify seismic events upon records prepared in those areas by the above techniques. In regions where reflection quality is poor, however, seismic records are difficult to interpret due to obscuring noise generated in near surface layers. Random waves, surface waves and multiple reflections received as near-surface reflections obscure correlation peaks in signal amplitude designating subsurface discontinuities and prevent their detection. Various methods have been developed in the prior art for increasing the signal-to-noise ratio by using a plurality of seismic detectors or geophones and combining the signals to produce a composite record. Various seismograph exploration methods have been developed for emphasizing the desired signal reflected from sub-surface structures and reducing or minimizing the unwanted or random energy or noise. Such methods include horizontal stacking, vertical stacking, differential mixing and others wherein composite data is obtained by combining preselected portions of field data in predetermined relationships. For example, in the horizontal stacking method a number of explosive charges are detonated in succession with the shotpoint with some of the seismometers being relocated between successive shots. Seismometer groups and shot points are paired such that for each pair energy propagated by each of several explosions travels a different path but is reflected from the same point or limited area on the sub-surface bed.

Thus, if a first explosive charge is detonated in a first shot hole, seismic energy is propagated in all directions, and a part of this energy is reflected upwardly from a point or area on an interface to a first seismometer group spaced horizontally from the shot point. The shot point and seismometer group are then relocated relative to the fist locations thereof, such that the energy transmitted from the shot point and reflected to the seisometer group is reflected from the same point or area on the interface. Accordingly the energy transmitted to the seismometer locations impinges on the sub-surface bed at approximately the same point for both shots, and except for a possible difference in elapsed time between the instant of detonation and the instant of reception of the reflected energy, the received signals should correspond. Thus, when the received energy derived from the two shots is properly combined, the reflected energy will be reinforced whereas unwanted energy, being non-coincident will be de-emphasized and the signal-to-noise ratio of the record of signals received from that point on the interface will be enhanced.

The apparatus of the present invention is completely versatile, and is adapted for use in compositing apparatus used for vertical stacking, differential mixing and all other processes involving compositing or transcribing of pluralities of seismic signals recorded on magnetic drums. Various methods and apparatus are available for combining energy received from successive shots or for compositing signals in accordance with various methods. A composite record can be made with drafting instruments by algebraically summing the instantaneous amplitudes of the traces produced by separately recording the several shots in the conventional manner. More satisfactory apparatus for combining the signals are those which accomplish the addition of predetermined ones of magnetically recorded channels of multi-channel recordings which are successively obtained for the various shots. Composite signals are obtained, for example, by means of apparatus such as described and claimed in copending application Serial No. 340,437 infra. By means of such apparatus signals which are to be added, or composited are corrected to apply static and dynamic time-scale corrections and are aligned with a common $T=0$ point of time reference. The signal traces are then read simultaneously to obtain a single composite signal. For example, three signal traces to be added are recorded in time-scale alignment in three parallel channels of a multi-channel magnetic tape recording apparatus. The three signals are then read and transmitted from the tape recording apparatus by a single reading head which reads the signals in the three channels simultaneously and transmits a single composite signal.

In various methods of preparation of seismograph record sections, including but not limited to those discussed above, in which the end product is a composite of a plurality of seismograph signals, it is frequently observed that all or portions of some of the signals to be composited are in some way defective. It is, for example, noted that poor seismometer-to-ground coupling may occasionally produce a weak trace, or possibly a defect in recording instrumentation may produce an occasional weak or distorted recording. In these cases, usually an entire trace among the traces to be composited is defective.

It is also commonly true, particularly when spreads are very long, that the early portion of those traces which are produced at the longer distances from the shot point cannot properly be corrected for normal movement. Such inability to correct for normal moveout is frequently inherent in the laws of propagation of seismic waves in that ray paths may be refracted in high-velocity layers both before and after reflection by a reflecting interface or indeed no reflection may occur at all and transmission of energy is solely by refraction. The ordinary normal moveout correction procedures are not adequate to compensate for strong refractions. It thus occurs that the traces representing considerable distances from the shot point are defective in their early portions. A similar defect is found in early portions of traces when the rate of change of normal moveout becomes great so that the frequency content of the reflections is drastically altered in the playback procedure. This defect is again inherent in the laws of physics governing wave propagation and signal structure and is independent of the means of data storage and reproduction.

In the present invention it is contemplated to effect an improvement over the prior compositing systems, such as those described in the Patent No. 2,732,906 to Harry Mayne, by eliminating from the composite, selected individual traces or portions thereof which have been observed to be, are known to be or may reasonably be expected to be, defective. A great improvement of signal-to-noise ratio is therefore attained.

In its simplest form, the procedure envisages providing a switch whereby the operator may manually disconnect a tape recorder reading head in the playback machine so as to eliminate entirely any undesired trace. It is, of course, important in this procedure that the operator be provided with means such as a cathode-ray oscilloscope or similar device for observing the character of individual recordings.

It is a primary object of the present invention to provide a method and apparatus for enhancing the signal-to-noise ratio in composite signal recordings.

It is another object of the present invention to provide a method and apparatus to improve the signal-to-noise ratio in composite seismic signal recordings by eliminating from the composite seismic signal selected defective signals or portions thereof.

A further object of the present invention is to provide in connection with seismic signal compositing apparatus an apparatus which quickly and efficiently removes unwanted signals or portions thereof from the signals being composited.

It is a further object of the present invention to provide such apparatus which introduces substantially no switching or other transient signals into the signals being composited.

Yet another object of the present invention is to provide an apparatus for the elimination of recorded seismic signals or portions thereof in a plurality of such signals to be composited, which apparatus is versatile with respect to the composite recording apparatus and method in which it is used and which allows the signals or portions to the eliminated to be quickly and efficiently selected by the operator of the compositing apparatus.

The present invention comprises the method of enhancing the signal-to-noise ratio of a time-scale seismic signal composited from a plurality of time-scale signal traces by preselecting and eliminating from the plurality to be composited defective signal traces or defective portions thereof. The apparatus for carrying out the method comprises means for observing the character of the plurality of signals to be composited and switch means connected to the signal output drum of a multichannel magnetic drum compositing apparatus for disconnected the reading head of the output drum in preselected portion of preselected channels thereof. In its presently preferred form the apparatus of the present invention comprises in general a multi-channel cam drum rotated synchronously with a playback drum in the compositing apparatus. A cam is mounted in each channel of the cam drum to be actuated at preselected positions of rotation of the drum. The cams when actuated, are interconnected with switches and auxiliary circuit elements to actuate the reading heads in the corresponding channels of the signal-output drum to the reproduce or non-reproduce conditions.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIGURE 1 is a schematic diagram of the apparatus of the present invention;

FIGURE 4a is a view in elevation of the mounting arrangement of switches and cams upon the cam drum of the presently preferred embodiment of the present invention;

FIGURE 4b is a sectional view taken along line 4b—4b of FIGURE 4a;

Figure 6:
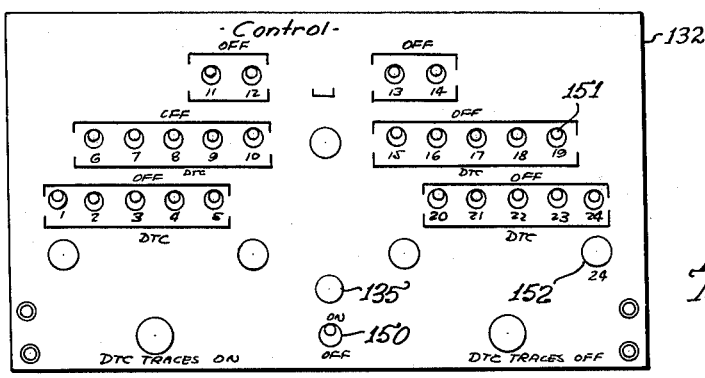

FIGURES 5a and 5b comprise a circuit diagram of the presently preferred embodiment of the present invention; and, FIGURE 6 is a view in elevation of the front panel of the control box of the present invention.

Although not limited thereto, the present invention is particularly advantageous for compositing records formed by the method known in the art as the "horizontal stacking" or "common reflection point" method of seismic profiling and will, accordingly, be explained in connection with such a method as explanatory of the utility of the present invention. By the horizontal stacking method of seismic exploration, a plurality of seismic detectors or geophones are first positioned at equally spaced stations along a line on the earth's surface, a series of seismic shot points are located along the same line or a line parallel to the line of detectors, a shot is successively fired at each of the shot points, and the energy picked up by each of these detectors in response to each shot is recorded. After one or a few shots have been taken, the line of the geophone stations is advanced by transferring detectors from one end of the line to the other. Shots are initiated at additional points along the line and the wave energy detected at each of the geophone stations in response to these later shots is recorded. By continuing to extend the line of geophone stations and the line of shot points in this manner, data for a continuous multiple coverage profile based upon common depth points are obtained. A complete description of horizontal stacking methods of seismic exploration is found in U.S. Patent No. 2,732,906, issued January 31, 1956 to W. H. Mayne, titled Seismic Surveying.

Illustrative of the compositing apparatus in combination with which the method and apparatus of the present invention has particular utility is that disclosed and claimed in copending U.S. patent application, Serial No. 340,437, filed January 27, 1964 by Savit, Slaven and Wells, titled, Method and Apparatus For Seismographic Composite Recording, and assigned to the assignee of the present application. In order to describe the construction, operation, and utility of the present invention it is necessary only to consider a portion of such compositing apparatus, which portion is shown partially schematically in FIGURE 1. In such compositing apparatus as that referred to above, first and second multi-channel magnetic recording drums A and B respectively are mounted upon a common shaft 101 and driven at constant speed by a synchronous motor. The first drum A is referred to hereinafter as the playback drum and the second drum is referred to hereinafter as the compositing drum.

In accordance with the present invention, a third drum C, hereinafter referred to as the cam drum C of the signal elimination or signal control apparatus D is also mounted upon the common shaft 101.

As an example of the construction and operation of such apparatus in a typical embodiment the playback drum A and compositing drum B are tape transport drum apparatus with associated transmission equipment including reading heads and recording equipment respectively. The playback tape transport drum A includes movable heads and associated apparatus for applying static and dynamic time-scale corrections to a field recorded tape. As is well known, it is necessary in order to composite a plurality of multichannel records, that the time-scale alignment of the signals in the various channels of the records be the same, such that the tapes can be added with a common $T=0$ point of time reference. Further, it is necessary to apply time-scale corrections to compensate for the varying horizontal distances of the detector groups from the shot point. That is, since the detector groups are at varying horizontal distances from the shot point and a greater time interval will be required for a reflected wave to reach the outermost detector group than the time interval which is required for the reflected wave to reach an innermost detector group from an interface the same vertical distance below each, moveout corrections are required. Thus, as the depth of the reflection increases, the time differential required to reach the various detector groups becomes smaller with the time differential approaching zero as the depth of the reflection approaches infinity. In addition to the above move out considerations, the various detector groups will in general be situated at various elevations so that it will be desirable to make time-scale adjustments to reduce all readings to a common horizontal plane. Similarly, origin adjustments of the time-scale are often necessary to compensate for varying amount of near-surface weathered material under the different detector groups. Illustrative static and dynamic time-scale correction means are those described and shown in U.S. Patent No. 3,044,041 by Salvatori, Wells and Glenn, issued July 10, 1962, titled Multichannel Recorder.

The playback drum A is driven at constant speed together with compositing drum B and the cam drum C in accordance with the present invention, by a synchronous motor. Each of the drums is adapted for multichannel magnetic recording in 28 channels, 24 of which are signal channels and 4 of which are auxiliary channels, one of which includes the time-break signal. The compositing drum B is adapted to record three signals, sometimes referred to hereinafter as signal traces, in each channel such that each principal channel contains three subchannels designated $a$, $b$ and $c$ (also termed subtracks $a$, $b$ and $c$). In order to add three signals in each channel to form a record having a single composite signal, it is essential that each of the recordings be commenced at the same time-scale position on the tape. That is, the $T=0$ or fiducial time point for each record must correspond to that of each of the previous recordings in order that a meaningful summation can be made. Thus, in twenty-four channels, each of the $a$, $b$ and $c$ recordings must be commenced at the same point on the recording drum. This is achieved by means of a moving head-rack apparatus as disclosed and claimed in copending U.S. patent application, Serial No. 220,720, filed August 31, 1962, now Patent No. 3,144,651, by Carl H. Savit, and Melvin Wells, titled Improved Time-Scale Recording Apparatus. That is, there is recorded in each channel of tape transport B, three signals. There is transmitted from each channel of the drum B, a single signal which is the sum of the three signals recorded in that channel of the drum. Typically, a single recording head is used for each channel but is adapted to record three traces or signals in one channel. It is obvious that three heads could also be utilized rather than a single head with three parallel recording means. A single reading head then corresponds to the channel in which the three signals have been recorded such that when the reading head reads the signal in the channel, it automatically adds the three signals and transmits a single composite signal. The term "added," as used herein includes averaging and the forming of linear combinations since it is necessary to maintain all signals within predetermined levels on the tapes. That is, it is undesirable to record signals at too low a level upon a magnetic tape by reason of the inherent background noise always present. Similarly, it is undesirable to record at too high a level as distortion is produced thereby. Accordingly, it is customary in the art to base-level signals prior to addition and recordation. The exact parameters to be used in controlling gains and in recording added signals or individual signals are dependent upon the characteristics of the tapes, tape recorders and amplifiers to be used. They are, however, well known in the art of seismograph and magnetic tape recording.

Figure 2:
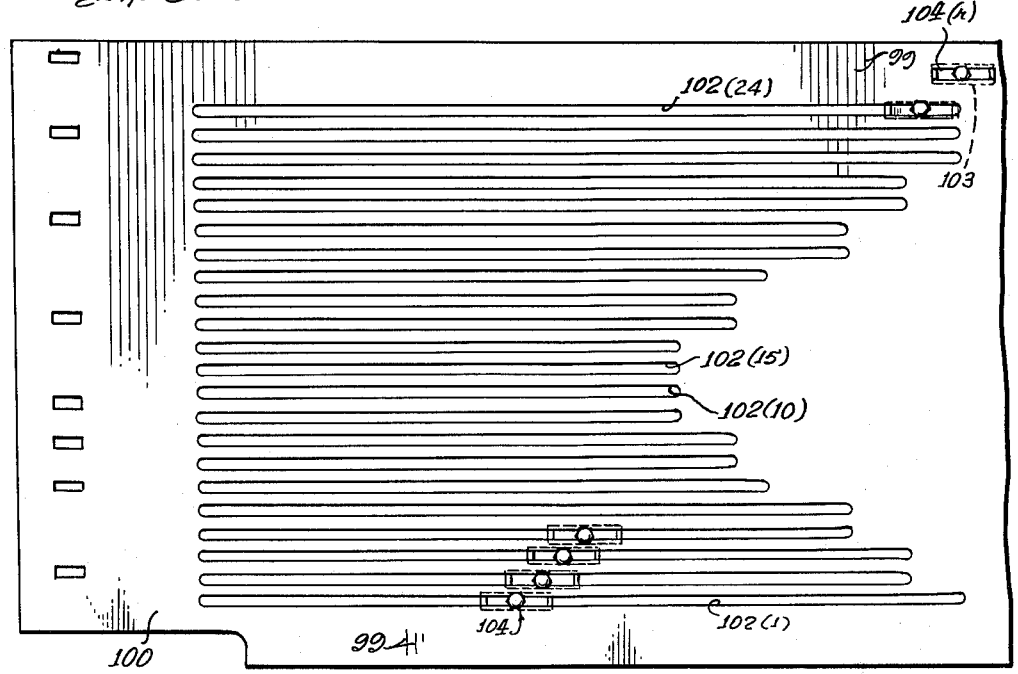
FIGURE 2 is a plan view of a cam sheet in accordance with the present invention.
Figure 3:
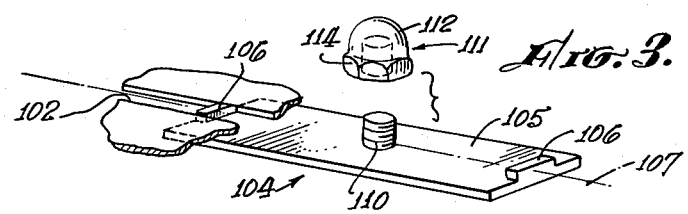
FIGURE 3 is a view in perspective of a cam adopted to be affixed to the cam sheet.

As discussed hereinbefore the cam drum C, as shown in FIGURE 1, is mounted upon the common shaft 101 with the playback drum and compositing drum for rotation therewith. Referring now particularly to FIGURES 1, 2 and 3, means are provided for affixing a plurality of cams in proximity to the cylindrical surface of the cam drum C. In the presently preferred embodiment the number of cams is equal to the number of information channels on the playback drum, to which elimination of part of the signal trace is to be applied, i.e., 20 in the illustrative embodiment. Although twenty-four information channels are present some of such traces will not require partial elimination in the illustrative embodiment because of the location of the detectors from which these traces emanate in the field set-up. Accordingly, as will become more apparent hereinafter the equipment of the present invention is sufficiently flexible in usage to provide total, partial, or no elimination of any predetermined signal trace. In addition, a single reset cam is provided in an auxiliary channel. The cams are affixed in the presently preferred embodiment of the apparatus by forming a cam sheet 100, as shown particularly in FIGURE 2, of material such as 0.005 stainless steel in the configuration of a magnetic tape of the type mounted upon the playback and compositing drums A and B. The material from which the cam sheet 100 is formed is such that it can be flexed longitudinally and mounted upon the surface of the drum C in the manner of a tape. A plurality of longitudinally extending slots 102 are cut through the cam sheet in closely spaced parallel relationship. The number of slots and their location and spacing correspond to the location and spacing of the information channels of the tape mounted on the playback drum for ease of identification and construction. Transverse lines or marks are scribed across the outer surface of the sheet as shown at 99. A plurality of such lines are scribed to identify the time-scale interval from a known $T=0$ point on a playback tape and on the cam sheet 100. Thus, each of the slots 102 labelled 102 (1–10 and 15–24) correspond to the similarly numbered information channels on the tape mounted on playback drum A. Two additional slots are provided one of which is identified as 103 and contains the reset cam.

A cam is provided for each of the slots 102 to which time-scale elimination is to be applied, i.e., 102(1–10) and 102(15–24) in this example, and is adapted to be positioned at any longitudinal position along the respective slot, which longitudinal position represents a time-scale position. In FIGURE 3, one such cam is shown, the remainder being identical. The cam assembly 104 is such that it provides a protrusion above the plane of the cam sheet at the preselected position along each of the slots. In its presently preferred form, each cam assembly 104 includes a base plate 105 which is greater in width than the width of a slot 102. The width of the base plate 105 is such, however, that two cams can be positioned in side by side relationship in adjoining slots, i.e., the width of the base is less than the center to center distance between slots. At each end of the base plate 105, are a pair of fingers 106 which are located symmetrically with respect to the longitudinal center line 107 through the cam. The fingers 106 at each end of the cam plate are approximately equal to the width of the slot 102 such that when the cam plate 105 is positioned beneath the slot 102, the fingers 106 will protrude through the slot and maintain the longitudinal alignment of the cam plate relative to the slot. The height of the fingers 106 is only slightly greater than the thickness of the cam sheet 100 so that their extension through the cam sheet is minimal and is in no event sufficient to actuate the switch to be actuated by the cam as discussed hereinafter. Along the longitudinal center line of the cam approximately at the mid-point thereof, there is provided a stud 110 which extends upwardly from the base plate and upon which is mounted a cap nut 111. The cap nut has a hemispherical surface 112 which acts as the cam surface and a portion 114 beneath the cam surface with flats to accommodate a wrench for threading the cap nut on the stud and tightening it thereon. Thus, to mount the cam 104 upon the cam sheet 100 in a particular slot 102, it is necessary only to insert the stud 110 and fingers 106 through the slot from the underside of the cam sheet, that is the side to be in contact with the drum, and to thread the cap nut upon the stud 110 extending upwardly from the sheet 100. Accordingly, it can be seen that when the cams are to be moved or relocated longitudinally along the slot it is necessary only to loosen the cap nut, slide the cam assembly 104 along the slot to the position and retighten the cap nut 111 into contact with the sheet 100. Accordingly, to mount the cams in each of the slots it is necessary to assemble the cam into each slot as described above prior to affixing the cam sheet 100 upon the drum. After all of the cams have been located in their respective slots and positioned at the preselected time-scale positions therein, the cam sheet 100 is mounted upon the cam drum C.

Referring now particularly to FIGURE 4, there is positioned on the chassis which supports the cam drum C a switch mounting rack 115. The switch mounting rack is affixed to the chassis in such manner that spaced apart plates 116 are positioned proximate to the surface of the tape transport drum and the cam sheet 100 when the cam sheet is affixed to the drum. Between the plates in alignment with the longitudinal axis of each slot is a microswitch 118 of the type which is actuated by movement of a lever 120 that extends from the body of the switch. The microswitchs are stacked and so positioned between the plates and in alignment with the slots that the contact point 121 of the switch actuating lever is proximate the outer surface of the cam sheet 100. The contact or actuating point 121 of the switch lever 120 is such that the switch lever will be moved to the actuated position when the cam surface 112 of the cam passes beneath the actuating point 121. Thus, it can be seen that by properly positioning the cam 104 in each slot of the cam sheet, when the cam sheet is mounted upon the cam drum C, the microswitch corresponding to the slot in which the respective cam is located will be actuated at a time-scale position determined by the position of the cam in that slot.

Referring now to FIGURES 5a and 5b, a circuit diagram of the presently preferred embodiment of the present apparatus is shown. In FIGURE 6, the control panel of the apparatus of the present invention is shown to further illustrate the operation of the apparatus. It is the function of the microswitches and the cams associated therewith in each slot of the cam sheet, which slot corresponds to a channel of the playback tape transport A, to determine when the signals transmitted from corresponding channels of the tape are to be recorded on the compositing drum. There are types of electronic circuitry to carry out this operation which types are well known to the art. In the presently preferred embodiment of the apparatus, a latching relay is utilized in connection with each microswitch. The latching relays are of the type well known to the art which remain in a given state until momentarily activated at which time they revert to and remain in the opposite state. The activation is provided by a pulse transmitted from the corresponding microswitch.

Thus, referring to FIGURES 1, 5 and 6, the plurality of latching relays 140 and the circuitry associated therewith, hereinafter referred to as the trace control circuitry shown in FIGURES 5a and 5, are interposed between the playback drum A and the compositing drum B. The circuitry is contained in a suitable trace control housing 132. In general therefore the reading heads of the playback drum A are transmitting the signals in each channel of a tape mounted thereon when the drums are rotating. The signal in each channel is transmitted to a preselected channel or track within a channel on a tape mounted on the compositing drum B. The trace control circuitry and latching relays therein allow passage of the signal from the reading head of the playback drum to the compositing drum when the latching relay is in one position and prevent passage in the other position. Thus, as shown in FIGURES 5 and 6, power is supplied through an on-off switch 150 to the microswitches 118 (1–10 and 15–24) from a 12 volt power supply 136. The microswitch 118 for each channel is connected through a line 138 to a latching relay 140 (1–10 and 15–24). In the embodiment shown in FIGURE 5, channels 11–14 are not controlled, so twenty trace control circuits are employed in this embodiment. The circuit for all channels is otherwise similar. The latching relays are shown in the latched "on" position which in the context of this description is the condition at which the signal will be passed for that channel from the playback drum to the compositing drum. Conversely, when the trace control circuit for a channel is in the "off" condition the signal in that channel will not pass to the compositing drum. In order to prevent or allow passage of the signal trace in a channel without introducing switching transients into the signal trace the presently preferred embodiment of this invention connects the latching relay across the input terminals of the primary winding of the transformer of the amplifier through which the signals from the playback head are transmitted to the compositing drum. Thus, as shown in FIGURE 5a and referring to channel 1 as exemplary, the signal from channel 1 of the playback drum A passes along input lines 145 and 147 to the terminals of the primary windings 139, shown schematically, of the amplifier (not shown).

In addition to the "on-off" circuitry for each channel to be controlled, as described above, provision is made in the presently preferred embodiment for controlling the signal passage in the reverse direction of the drum. Thus, if it is desired to reverse the "on" and "off" positions of the circuits to allow for operation upon reverse rotation of the drum there is provided a normal and reverse gang switch consisting of individual switch sections 146 operated by common shaft 148. Upon actuation of this switch the fixed terminals are reversed such that 140(a) becomes the "on" terminal and 140(b), the "off" terminal. This is accomplished by ganged two position switch sections 146 which when moved to the reverse position connects the fixed contacts 140(b) terminal to the primary winding and disconnects the 140(a) contacts. Thus, with switch sections 146 moved to the reverse position by rotation of the gang switch shaft 148 (FIGURE 5) the signal is shorted and not allowed to pass when the short circuit is completed by movement of the movable contacts 140(c) into contact with fixed contacts 140(b) and opened to allow passage when movable contacts 140(c) is in contact with contacts 140(a). The latching relay is connected by lines 141 and 144 to the terminals of the primary winding 139. The connection by line 144 is made from one terminal of the winding 139 to the movable contacts 140(c) terminal of the relay and line 141 connects the opposite terminal of transformer winding 139 to the fixed contacts 140(a) terminal of the relay. Thus, when relay 140 is in the "off" condition at which the movable contacts 140(c) are in contact with the fixed contacts 140(a) the transformer winding terminals are closed to short circuit the signals appearing from the reading head to the amplifier at the winding terminals along lines 145 and 147. Thus, no signal will pass to the recording head from that channel. When the latching relay 140 is in the "on" position as shown in FIGURE 5, the movable contact 140(c) is in contact with fixed terminal 140(b) to open the circuit from the latching relay to the primary winding 139 and the signal presented to the amplifier in that channel passes to the recording head of the compositing drum B. When the latching relay is in the "off" position upon receipt of a pulse from the microswitch 118(1) in channel 1, for example, of the cam drum apparatus the pulse is transmitted along line 138(1) to the coil 143(a) of the relay. Upon receipt of the pulse the coil 143(a) is energized and moves the movable contacts into the "on" condition as shown in FIGURE 5 in which condition the signal is passed in the channel from the reading head to the recording head of the compositing drum through the amplifier. When a pulse is received at the coil 143(b) along line 157 from the reset microswitch 119 (FIGURE 5b) or the reset-off switch 153, as discussed more fully hereinafter, the latching relay is substantially instantaneously moved to latched in the opposite of "off" condition as which no signal passes to the compositing drum. The relays 140 are of the type which are actuated by the pulse. A capacitor shunt 145 between the coil terminals of the relay further eliminates switching transients. As discussed hereinbefore the pulse from the microswitch is supplied when the cam surface 112 moves the microswitch arm 120 radially outward from the drum surface.

As discussed briefly hereinbefore, in addition to the "off to on" operation of the latching relays by the microswitches in each information channel to be controlled, a reset cam 104(r) is provided in an auxiliary slot 103 to reverse the condition of the relays by switching them from the "on to off" condition after passage of the signals has been completed. Referring to FIGURE 2, a reset cam 104(r) is placed in slot 103 at a point beyond the point at which signals are to be recorded from the playback drum. The reset microswitch 119 when actuated transmits a pulse along line 157 to actuate the "off" coil 143(b) of all of the latching relays simultaneously. This allows repeat cycle operation for each revolution of the drum.

A manually operable "on-off" switch is positioned in the circuit for each information channel including channels 11–14 which are not time-scale controlled. Such switches are typically toggle switches shown as 151 in FIGURES 5 and 6. The switch for each channel will eliminate recordation in that channel when operated to the "off" position by shorting the circuit between lines 141 and 144 to prevent passage of the signal in that channel. A push to latch switch 152 is provided to reset all of the relays 140 to the "on" position simultaneously by supplying power through diodes 159 to the "on" coils 143(a) of all of the relays simultaneously. A push to reset switch 153 when actuated supplies power to all of the "off" coils 143(b) to reset all of the relays to the "off" position.

Thus, in the illustrative embodiment a cam 104 is positioned in each of the slots 102 at the position at which recordation is to commence in each of the information channels 1–10 and 15–24 of the multichannel record mounted upon the playback drum A. A reset cam 104(r) is positioned at the opposite end of the cam slot in an opening 103 at the time-scale position at which recordation is to end in all channels. The cam sheet 100 is then mounted upon the cam drum C. With all power supplies activated and with the relays 140 in the "off" position such that no trace will be transmitted in channels 1–10 and 15–24, rotation of the drums is begun. The apparatus connected with the playback drum is in a transmitting condition such that the reading heads of the drum A transmit a signal trace in each channel to the amplifiers 138. Since the latching relays are in the "off" position the traces are shorted at the primary winding 139 of the transformer in the amplifiers and no signals pass in the controlled channels. The "on-off" switches 151 in each relay circuit will be in the "on" position such that upon commencement of transmission, the signal traces will pass to the compositing drum from channels 11–14. As the cam 104 in each of channels 1–10 and 15–24 passes beneath its respective microswitch the relay for that channel is pulsed to the "on" condition and recordation on the compositing drum commences from that channel of the playback drum. As the drums continue to rotate, the signal trace in all of the channels is recorded until the reset cam 104(r) passes beneath the reset cam 119. As discussed hereinbefore this pulses the relays in all of the channels 1–10 and 15–24 to the "off" position simultaneously and recordation from those channels ceases. The apparatus is then in condition for another cycle of operation. If, however, it is desired to reverse the drums to record in the opposite direction, the reverse switch section 146 are actuated. As the reset cam 104(r) passes beneath the reset microswitch, the relays 140 are pulsed from the "off" to the "on" condition and recordation commences at the time-scale position at which it terminated in normal forward operation of the apparatus. Recordation continues in the reverse direction until each of the cams 104 passes beneath its corresponding microswitch to pulse the relay in that channel to the "off" position and terminate recordation at the point at which it began in that channel in forward operation of the apparatus. As discussed hereinbefore the apparatus of the present invention can be by-passed by latching the relays in the "on" position by means of switch 152 and conversely all channels can be prevented from recording by actuating "on-off" switches 151 to the "off" position. Similarly any one or more preselected signal traces can be omitted from the recording by actuating the "on-off" switch 151 for that channel or those channels to the "off" position. Indicator lights such as 154 indicate the condition of operation of the apparatus.

Thus, it may be seen that the present invention makes possible control of time-scale recordation of any channel of a time-scale seismographic recording by selectively eliminating all or portions of signal traces being recorded. It should be noted that the present apparatus makes possible the easy and efficient substitution of one programed operation for another by merely replacing cam sheets on the cam drum with the cams arranged in predetermined time-scale locations. Additionally, when no such control is necessary the cam drum is available for normal magnetic recording or transmitting operations.

What is claimed is:

1. The method of increasing the signal-to-noise ratio of composite seismic signals comprising:
    transmitting from a playback apparatus a plurality of seismic signals;
    rejecting from said seismic signals an initial time-scale portion of predetermined ones of said plurality of seismic signals, said initial time-scale portion being variable by a preselected amount for each of said predetermined ones of said plurality of seismic signals;
    recording said plurality of seismic signals; and
    adding said plurality of said seismic signals in time-scale alignment to obtain a composite signal.

2. The method of increasing the signal to noise ratio of composite seismic signals comprising:
    transmitting from a playback apparatus a plurality of seismic signals to each channel of a multichannel recording apparatus;
    rejecting from said seismic signals initial, defective time-scale portions of said seismic signals, said time-scale portions being variable by a preselected amount from zero to the maximum time scale length of preselected ones of said plurality of seismic signals;
    recording said plurality of seismic signals in said multichannel recording apparatus; and,
    adding selected ones of said plurality of seismic signals in time-scale alignment to obtain a composite signal.

3. In seismograph recording apparatus, signal-control apparatus for eliminating a signal trace or time-scale portion thereof transmitted from a signal transmission apparatus for recordation at a recording apparatus comprising:
    a drum rotatable in predetermined relationship with the transmission apparatus;
    switch means on contactual relationship with said drum, said switch means being operable at a predetermined time-scale position of said drum;
    signal transmission circuit means operatively connected to said switch means, said transmission circuit means being such as to prevent conduction of the signal trace from the transmission apparatus to the recording apparatus in a first condition of said circuit means and to conduct said signal in a second condition thereof, said switch, when actuated, converting said circuit means from one condition to the other condition.

4. In seismograph recording apparatus, a signal recording control apparatus for eliminating a signal trace or predetermined time-scale portion thereof transmitted from a rotating transmission drum apparatus for recordation at a rotating drum recordation apparatus comprising:
    a control drum rotatable synchronously with said transmission drum;
    switch means in contactual relationship with said control drum, said switch means being operable at a predetermined time-scale position of said control drum;
    signal transmission circuit means operatively connected to said switch means, said transmission circuit means being such as to prevent conduction of the signal trace from said transmission drum to said recording drum in a first condition of said circuit means and to prevent conduction of said signal in a second condition, said switch when actuated converting said circuit means from one condition to the other condition.

5. In seismograph recording apparatus, signal recording control apparatus for eliminating a signal trace or predetermined time-scale portion thereof from preselected ones of such signal traces transmitted from a multi-channel magnetic transmitting drum apparatus for recordation at time-scale recording apparatus comprising:
    a control drum rotatable synchronously with said transmitting drum;
    a plurality of switch means in operative contact with said control drum each of said plurality of switch means operable at a predetermined time-scale position of said control drum and at a corresponding time-scale position of a respective one of said signal trace channels of said transmitting drum;
    a plurality of signal transmission circuit means each operatively connected to a corresponding one of said switch means, said transmission circuit means being such as to conduct the signal trace from said transmitting drum to said recording apparatus in a first condition of said circuit means and to prevent conduction of said signal in a second condition, said switch when actuated converting said circuit means from one condition to the other condition.

6. In seismograph recording apparatus, signal recording control apparatus for eliminating a signal trace or predetermined time-scale portion thereof from preselected ones of such signal traces transmitted from a multi-channel magnetic transmitting drum apparatus to time-scale recording apparatus comprising:
    a cam drum rotatably synchronously with said transmitting drum;
    a plurality of cams positioned on said cam drum each at a predetermined time-scale position thereon relative to a time-scale position in a respective preselected channel of the transmitting drum, a plurality of switch means each operable by a respective one of said cams at said time-scale position thereof and at a corresponding time-scale position of a respective one of said signal-trace channels of said transmitting drum;
    a plurality of signal transmission circuit means each operatively connected to a corresponding one of said switch means, said transmission circuit means being such as to prevent conduction of the signal trace from said transmitting drum to the recording apparatus in a first condition of said circuit means to conduct said signal in a second condition thereof, said switch when actuated converting said circuit means from one condition to the other condition.

7. In seismograph recording apparatus, signal recording control apparatus for eliminating a signal trace or predetermined time-scale portion thereof from preselected ones of such signal traces transmitted from a multi-channel magnetic transmission drum to a time-scale recording apparatus comprising:
    cam supporting means movable synchronously with the transmission drum, a plurality of cams positioned on said support means, each at a predetermined time-scale position thereon relative to a time-scale position in a respective preselected channel of said transmission drum;
    a plurality of switch means each operable by a respective one of said signal-trace channels of said transmission drum;
    a plurality of signal transmission circuit means each operatively connected to a corresponding one of said switch means, said transmission circuit means being such as to prevent conduction of the signal trace from said transmission drum to the recording apparatus in a first condition of said circuit means and to conduct said signal in a second condition thereof, said switch when actuated converting said circuit means from one condition to the other condition.

8. In seismograph recording apparatus, signal recording control apparatus for eliminating a signal trace or predetermined time-scale portion thereof from preselected ones of such signal traces transmitted from a multi-channel magnetic drum to a time-scale recording apparatus comprising:

a cam drum rotatable synchronously with said transmitting drum, a cam sheet detachably mounted upon said cam drum, a plurality of cams positioned on said cam sheet each at a predetermined time-scale position thereon relative to a time-scale position in a respective preselected channel of said transmitting drum, a plurality of switch means each operable by a respective one of said cams at the time-scale position thereof and to a corresponding time-scale position of a respective one of said signal-trace channels of said transmitting drum;

a plurality of signal transmission circuit means each operatively connected to a corresponding one of said switch means, said transmission circuit means being such as to conduct the signal trace from said transmission drum to the recording apparatus in a first condition of said circuit means and to prevent conduction of said signal in a second condition, said switch when actuated converting said circuit means from one condition to the other condition.

9. In seismograph recording apparatus, signal recording control apparatus for eliminating a signal trace or predetermined time-scale portion thereof from preselected ones of such signal traces transmitted from a multi-channel magnetic drum to time-scale recording apparatus comprising:

a cam drum rotatable synchronously with said transmitting drum;

a cam sheet detachably mounted upon said cam drum, a plurality of cams positioned on said cam sheet each at a predetermined time-scale position thereon relative to a time-scale position in a respective preselected channel of said transmitting drum, a plurality of microswitches non-rotatably mounted relative to said cam drum each operable by a respective one of said cams at the time-scale position thereof and at a corresponding time-scale position of a respective one of said signal-trace channels of said transmitting drum;

a plurality of signal transmission circuit means each operatively connected to a corresponding one of said switch means, said transmission circuit means being such as to conduct the signal trace from said transmission drum to the recording apparatus in a first condition of said circuit means and to prevent conduction of said signal in a second condition, said switch when actuated converting said circuit means from one condition to the other condition.

10. In seismograph recording apparatus, signal recording control apparatus for eliminating a signal trace or predetermined time-scale portion thereof from preselected ones of such signal traces transmitted from a multi-channel magnetic drum to a time-scale recording apparatus comprising:

a cam drum rotatable synchronously with said transmitting drum;

a cam sheet detachably mounted upon said cam drum, a plurality of cams positioned on said cam sheet each at a predetermined time-scale position thereon relative to a time-scale position in a respective preselected channel of said transmitting drum, a plurality of microswitches non-rotatably mounted relative to said cam drum each operable by a respective one of said cams at the predetermined time-scale position thereof and to a corresponding predetermined time-scale position thereof and to a corresponding predetermined time-scale position of a respective one of said signal-trace channels of said transmitting drum;

a plurality of signal transmission circuit means each operatively connected to a corresponding one of said switch means, each of said circuit means being such as to conduct the signal trace from said transmission drum to the recording drum when said circuit means is one state and to prevent conduction of said signal when said circuit means is in another state, said switch when actuated by said cam converting said circuit means from said one state to said other state.

11. In seismograph recording apparatus, signal recording control apparatus for eliminating a signal trace or predetermined time-scale portion thereof from preselected ones of such signal traces transmitted from a multi-channel magnetic drum to a time-scale recording apparatus comprising:

a cam drum rotatable synchronously with said transmitting drum;

a cam sheet detachably mounted upon said cam drum, said cam sheet being a sheet of flexible material substantially similar in configuration to a magnetic tape, a plurality of cams positioned on said cam sheet each at a predetermined time-scale position thereon relative to a time-scale position in a respective preselected channel of said transmitting drum, a plurality of switch means each operable by a respective one of said cams at the time-scale position thereof and at a corresponding time-scale position of a respective one of said signal-trace channels of said transmitting drum;

a plurality of signal transmission circuit means each operatively connected to a corresponding one of said switch means, said transmission circuit means being such as to conduct the signal trace from said transmission drum to the recording apparatus in a first condition of said circuit means and to prevent conduction of said signal in a second condition, said switch when actuated converting said circuit means from one condition to the other.

12. In seismograph recording apparatus, signal recording control apparatus for eliminating a signal trace or predetermined time-scale portion thereof from preselected ones of such signal traces transmitted from a multi-channel magnetic drum to a time-scale magnetic recording drum comprising:

a cam drum rotatable synchronously with said transmitting drum;

a cam sheet detachably mounted upon said cam drum, said cam sheet being a sheet of flexible material substantially similar in configuration to a magnetic tape, a plurality of cams positioned on said cam sheet each at a predetermined time-scale position thereon relative to time-scale position in a respective preselected channel of said transmitting drum, a plurality of microswitches non-rotatably mounted relative to said cam drum each operable by a respective one of said cams at the time-scale position thereof and to a corresponding time-scale position of a respective one of said signal-trace channels of said transmitting drum;

a plurality of signal transmission circuit means each operatively connected to a corresponding one of said microswitches, said transmission circuit means each including a bi-state relay adapted to conduct the signal trace from said transmission drum to the recording drum in a first state of said relay and to prevent conduction of said signal in a second state, said switch when actuated converting said circuit relay from one state to the other state.

13. Seismograph composite recording apparatus comprising:
a playback apparatus, said playback apparatus being adapted to transmit seismic signal traces;
a recording apparatus adapted to record said seismic signal traces transmitted from said playback apparatus;
circuit transmission means for transmitting said signal traces from said playback to said recording apparatus;
signal trace rejection means including a control cam movable in predetermined relationship with said playback apparatus, switch means operable at a predetermined time-scale position of said control cam, control circuit means interposed in said transmission circiut means and operably connected to said switch to conduct the signal trace from said playback apparatus to said recording apparatus in one state of said control circuit means and to prevent conduction of said signal trace in another state of said control circuit means, said control circuit means being actuatable from said one state to said other state by operation of said switch means.

14. Seismograph composite recording apparatus comprising:
a multi-channel magnetic drum playback apparatus adapted to transmit seismic signal traces in a plurality of channels;
a multi-channel recording apparatus adapted to record a plurality of signal traces in each of said channels;
signal control apparatus for eliminating a time-scale portion of preselected ones of said signal traces transmitted from said playback apparatus to said recording apparatus, said signal control apparatus including a control drum rotatable in predetermined relationship with said playback apparatus;
switch means operable at a predetermined time-scale position of said control drum in each of said channels;
signal transmission circuit means operatively connected to said switch means;
said transmission circuit means being adapted to conduct the signal trace in each of said channels from said playback apparatus to said recording apparatus in a first condition of said circuit means and to prevent conduction of said signal in a second condition, said switch, when actuated, converting said circuit means from one condition to the other condition.

15. Seismograph composite recording apparatus comprising:
a multi-channel magnetic drum playback apparatus adapted to transmit seismic signal traces in a plurality of channels;
a multi-channel recording apparatus adapted to record a plurality of signal traces in each of said channels;
signal control apparatus for eliminating a time-scale portion of preselected ones of said signal traces transmitted from said playback apparatus to said recording apparatus, said signal control apparatus including cam supporting means movable synchronously with said playback drum;
a plurality of cams positioned on said support means each at a predetermined time-scale position thereon relative to a time-scale position in a respective preselected channel of said playback drum, a plurality of switch means each operable by a respective one of said cams at the time-scale position thereof and at a corresponding time-scale position of a respective one of said signal-trace channels of said playback drum;
a plurality of signal transmission circuit means each operatively connected to a corresponding one of said switch means, said transmission circuit means being adapted to conduct the signal trace from said playback drum to a recording means in a first condition of said circuit means and to prevent conduction of said signal in a second condition, said switch, when actuated, converting said circuit means from one condition to the other condition.

16. Seismograph composite recording apparatus comprising:
a multi-channel magnetic drum playback apparatus adapted to transmit seismic signal traces in a plurality of channels;
a multi-channel recording apparatus adapted to record a plurality of signal traces in each of said channels;
signal control apparatus for eliminating a time-scale portion of preselected ones of said signal traces transmitted from said playback apparatus to said recording apparatus, said signal control apparatus including a cam drum rotatable synchronously with said playback drum;
a cam sheet detachably mounted upon said cam drum, a plurality of cams positioned on said cam sheet each at a predetermined time-scale position thereon relative to a time-scale position in a respective preselected channel of said playback drum, a plurality of microswitches non-rotatably mounted relative to said cam drum each operable by a respective one of said cams at the time-scale position thereof and to a corresponding time-scale position to a respective one of said signal-trace channels of said playback drum;
a plurality of signal transmission circuit means each operatively connected to a corresponding one of said switch means, said transmission circuit means being adapted to conduct the signal-trace from said playback drum to the recording apparatus in a first state of said circuit means and to prevent conduction of said signal in a second state, said switch when actuated converting said circuit means from one state to the other state.

17. Seismograph composite recording apparatus comprising:
a multi-channel magnetic transmitting drum playback apparatus adapted to transmit seismic signal traces in a plurality of channels;
a multi-channel recording apparatus adapted to record a plurality of signal traces in each of said channels;
signal control apparatus for eliminating a time-scale portion of preselected ones of said signal traces transmitted from said playback apparatus to said recording apparatus, said signal control apparatus including a cam drum rotatable synchronously with said playback drum;
a cam sheet detachably mounted upon said cam drum, said cam sheet being a sheet of flexible material substantially similar in configuration to a magnetic tape, a plurality of cams positioned on said cam sheet each at a predetermined time-scale position thereon relative to a time-scale position in a respective preselected channel of said playback drum, a plurality of microswitches non-rotatably mounted relative to said cam drum each operable by a respective one of said cams at the time-scale position thereof and at a corresponding time-scale position of a respective one of said signal-trace channels of said playback drum;
a plurality of signal transmission circuit means each operatively connected to a corresponding one of said switch means, each of said circuit means including a bi-state relay, said transmission circuit means being adapted to conduct the signal trace from said playback drum to the recording drum when said relay is in a first state and to prevent conduction of said signal trace when said relay is in another state, said switch, when actuated, converting said relay from said one state to said other state.

(References on following page)

References Cited by the Examiner

UNITED STATES PATENTS

| | | | |
|---|---|---|---|
| 2,838,743 | 6/1958 | Fredriksson | 340—15 |
| 2,858,523 | 10/1958 | Hawkins | 340—15 |
| 2,876,428 | 3/1959 | Skelton et al. | 340—15 |
| 2,898,574 | 8/1959 | Palmer | 346—33 X |
| 2,976,107 | 3/1961 | Klein | 346—109 |
| 3,112,397 | 11/1963 | Crook | 235—181 |

RICHARD B. WILKINSON, *Primary Examiner.*

LEO SMILOW, *Examiner.*

J. W. HARTARY, *Assistant Examiner.*